C. C. WARDEN.
RAKE CLEANER.
APPLICATION FILED JUNE 27, 1914.
1,142,740.
Patented June 8, 1915.
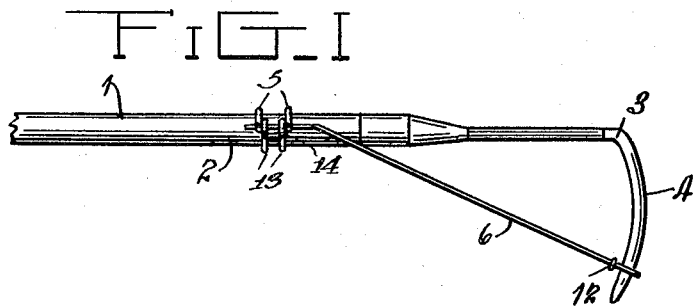
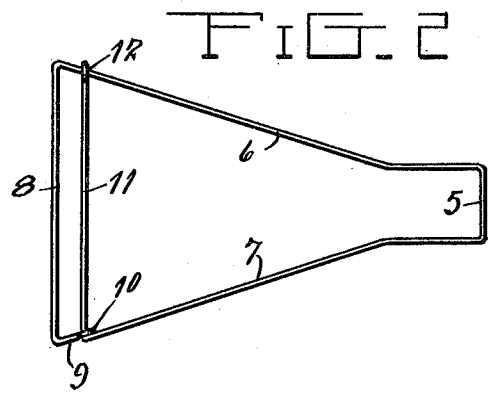
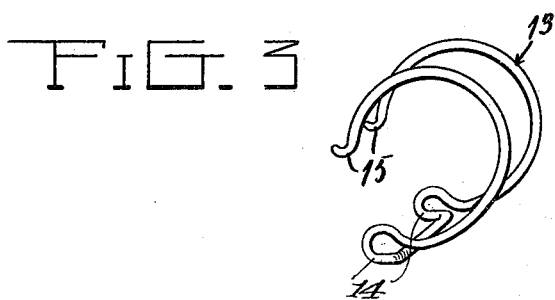
Inventor
C. C. Warden

UNITED STATES PATENT OFFICE.

CLARENCE C. WARDEN, OF RENO, NEVADA.

RAKE-CLEANER.

1,142,740.  Specification of Letters Patent.  Patented June 8, 1915.

Application filed June 27, 1914. Serial No. 847,777.

*To all whom it may concern:*

Be it known that I, CLARENCE C. WARDEN, a citizen of the United States, residing at the city of Reno, in the county of Washoe and State of Nevada, have invented certain new and useful Improvements in Rake-Cleaners, of which the following is a specification.

My invention relates to new and useful improvements in devices for cleaning the teeth of rakes of trash and other foreign matter and has for its primary object to provide a simple and inexpensive cleaning device that may be easily and readily attached to rakes of all kinds without necessitating much time and labor or requiring any changes in the construction of the rake.

An important object of my invention is to provide an attachment of the character described that will automatically strip the teeth of a rake of leaves, trash, and other foreign matter immediately upon the lifting of the head of the rake from the ground at the time that the teeth have an accumulation of trash, leaves or other foreign matter thereon.

My invention further aims to improve devices of the character described, so as to render them more practical, simple and efficient in operation inexpensive to manufacture and more commercially desirable.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a side elevation of the device in assembled position, Fig. 2 is a plan view of the attachment removed, and, Fig. 3 is a detail perspective view of the clamp to hold the attachment to the rake.

Referring to the drawings by characters of reference, the numeral 1 designates as an entirety, a rake consisting of a handle 2, head 3 and teeth 4 arranged in spaced relation to one another in the ordinary manner and secured to the head 3.

My improved rake cleaning attachment consists of a single piece of resilient wire, preferably, that is bent intermediate its ends to form a semi-circular loop 5 which is designed to engage the handle 2 of the rake and conform thereto in being curved. From the free ends of the loop 5 the material or wire is extended so as to provide divergent arms 6 and 7. The arm 6 is formed slightly longer than the one 7 and at its outer end has formed integral therewith a right angularly extending stripping portion or rod 8 that extends to a point adjacent the outer end of the arm 7 and at its outer end is provided with a right angular extension 9 that extends inwardly toward the loop 5 and is formed with an eye 10 on its free end.

A stripping portion or rod 11 is formed integral at one end with the free end of the arm 7 and extended at right angles thereto. The eye 10 receives the rod 11 and an eye 12 formed on the other end of the rod 11 receives the arm 6 intermediate its ends. It will thus be seen that the stripping bars 8 and 11 are spaced and parallel to one another. The bars 8 and 11 are of such length as to permit the teeth 4 of the rake to be positioned therebetween. That portion of the arm 6 that extends beyond the point where the eye 12 connects the rod 11 with the arm 6 engages the end tooth at one side of the rake and the angularly extending portion 9 engages the end tooth on the other side of the rake. Thus guides are formed for the rods 8 and 11.

As a means for clamping the attachment so as to be securely and detachably held upon a rake, I provide a clamp designated 13 as an entirety that is preferably formed of resilient wire and bent into an approximate annular form. One end of the clamp 13 is formed with a pair of eyes 14 that loosely receive the arm 7. Hooks 15 are formed on the other end of the clamp 13 and arranged to engage the arm 6. The clamp 13 in being curved readily conforms to the ordinary type of rake handle and in being resilient provides a comparatively rigid connection for the attachment relative to the rake. The arms 6 and 7 are normally disposed downwardly in an inclined plane with relation to the handle 2 and are in such position that when the rake is being used in the ordinary manner any matter collected between the teeth or engaged by the rods 8 and 11 will cause the rods 8 and 11 and arms 6 and 7 to move upwardly or against the spring tension of the arms. When the rake is lifted from the ground and the tension of the arms 6 and 7 releases the bars 8 and 11 are moved downwardly with relation to the teeth 4 and serve to strip the teeth of leaves, trash or other foreign matter which has collected thereon. It will be readily seen that the operation of cleaning the rake is practically automatic. The tension of the arms 6 and 7 may be regulated by their disposition relative to the rake handle and in accordance with the size and character of the rake to which the attachment is to be operated in connection with.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

In a rake cleaner, the combination with a rake consisting of a head, teeth on said head and a handle for said head of a pair of resilient arms, a semicircular loop extending at right angles to the arms and joined integral with certain ends thereof, said loop partially surrounding the handle, means to clamp the arms to the rake handle, each of the arms being provided with a right angular extension at its outer end, said right angular extensions forming stripping bars arranged on opposite sides of the teeth, said stripping bars being normally disposed adjacent the free ends of the teeth.

In testimony whereof I affix my signature in presence of two witnesses.

CLARENCE C. WARDEN.

Witnesses:
 JEROME L. VAN DERWERKER,
 CHARLES H. BURRILL.

Copies of this patent may be obtained for five cents each, by addressing the "Commissioner of Patents, Washington, D. C."